(12) United States Patent
Katayama

(10) Patent No.: US 7,415,071 B2
(45) Date of Patent: *Aug. 19, 2008

(54) METHOD FOR DECODING AN MPEG PICTURE STREAM

(75) Inventor: Hiroshi Katayama, Tokyo (JP)

(73) Assignee: Sony Corporation (JP)

( * ) Notice: Subject to any disclaimer, the term of this patent is extended or adjusted under 35 U.S.C. 154(b) by 377 days.

This patent is subject to a terminal disclaimer.

(21) Appl. No.: 11/093,791

(22) Filed: Mar. 30, 2005

(65) Prior Publication Data

US 2005/0180508 A1 Aug. 18, 2005

Related U.S. Application Data

(63) Continuation of application No. 09/912,955, filed on Jul. 25, 2001, now Pat. No. 6,898,246.

(30) Foreign Application Priority Data

Jul. 25, 2000 (JP) ............................ P2000-224367

(51) Int. Cl.
*H04B 1/66* (2006.01)
(52) U.S. Cl. ................................................ 375/240.25
(58) Field of Classification Search ............ 375/240.13, 375/240.25, 240.26, 240.17, 240.01, 240.12, 375/240.16; 378/240.15; *H04B 1/66*
See application file for complete search history.

(56) References Cited

U.S. PATENT DOCUMENTS

| | | | | |
|---|---|---|---|---|
| 6,061,449 A | * | 5/2000 | Candelore et al. | .............. 380/28 |
| 6,069,919 A | * | 5/2000 | Kwon et al. | ............ 375/240.12 |
| 6,128,340 A | | 10/2000 | Ozcelik et al. | |
| 6,141,383 A | | 10/2000 | Yu | |
| 6,252,907 B1 | * | 6/2001 | Hwang | ................... 375/240.25 |
| 6,898,246 B2 | * | 5/2005 | Katayama | ............... 375/240.25 |
| 2001/0026677 A1 | | 10/2001 | Chen et al. | |
| 2003/0012552 A1 | | 1/2003 | Line et al. | |
| 2003/0058941 A1 | | 3/2003 | Chen et al. | |

* cited by examiner

*Primary Examiner*—Tung Vo
(74) *Attorney, Agent, or Firm*—Lerner, David, Littenberg, Krumholz & Mentlik, LLP

(57) ABSTRACT

When a digital broadcast receiver selects a channel and thereby changes an MPEG picture stream, a video decoder starts a decoding operation in response to an instruction to start decoding. When a predictive coded picture includes an intra slice and an intra macroblock, the video decoder decodes the intra slice and the intra macroblock of the predictive coded picture without waiting for an intra picture to be decoded. When a macroblock to be referred to has previously been decoded, the video decoder further decodes a non-intra slice and a non-intra macroblock of the predictive coded picture by using a decoding result of the macroblock to be referred to. Thus, when changing the channel, for example, it is possible to quickly obtain output picture data, shorten interruption of the pictures, and check a picture of the next channel in a short time.

3 Claims, 8 Drawing Sheets

TIME

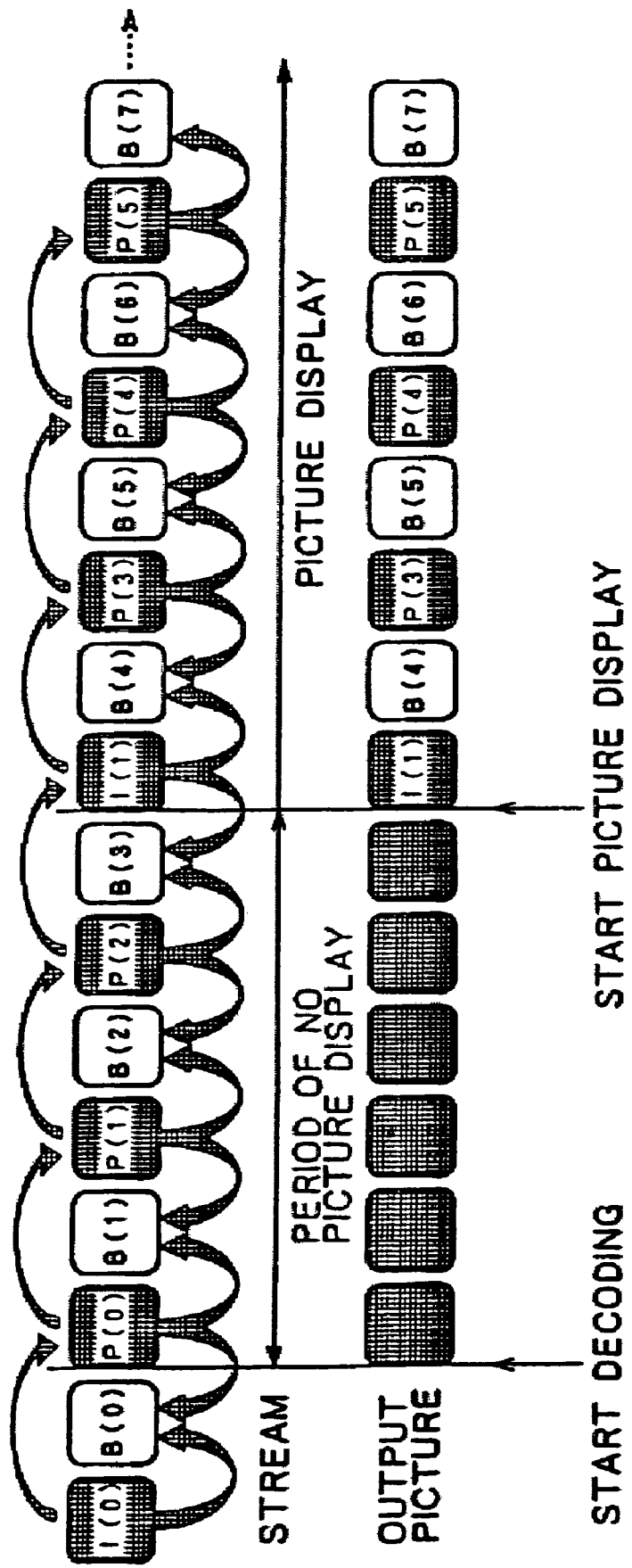

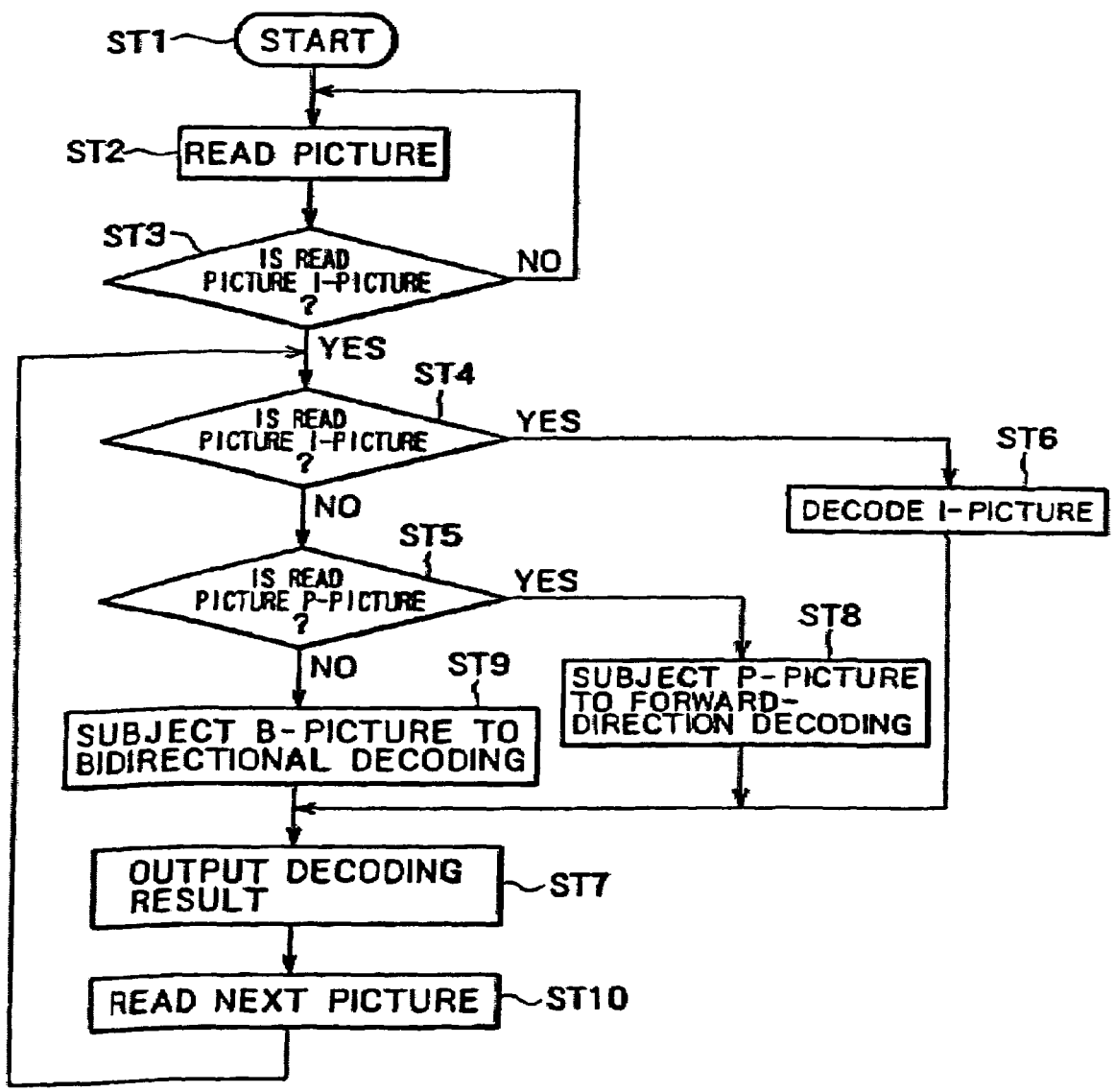

METHOD FOR DECODING AN MPEG PICTURE STREAM

CROSS-REFERENCE TO RELATED APPLICATIONS

The present application is a continuation of U.S. application Ser. No. 09/912,955, filed Jul. 25, 2001 now U.S. Pat. No. 6,898,246 and entitled APPARATUS AND METHOD FOR DECODING AN MPEG PICTURE STREAM, which claims priority from Japanese Application No. P2000-224367 filed Jul. 25, 2000, the entire disclosures of which are hereby incorporated by reference herein.

BACKGROUND OF THE INVENTION

The present invention relates to an apparatus and a method for decoding an MPEG picture stream suitable for use in a digital broadcast receiver, for example. More particularly, the present invention relates to an apparatus and the like for decoding an MPEG picture stream that make it possible to quickly obtain output picture data by decoding, when a predictive coded picture includes an intra slice or an intra macroblock, the intra slice or the intra macroblock of the predictive coded picture after an instruction to start decoding, without waiting for an intra picture to be decoded.

As a picture stream handled in a digital broadcast receiver, there is an MPEG (Motion Picture Experts Group) picture stream. As is well known, MPEG coded data is represented by a hierarchical structure. The hierarchical structure comprises, from the top down: a sequence layer, a GOP (Group of Picture) layer, a picture layer, a slice layer, a macroblock layer, and a block layer.

FIG. 5 shows a sequence layer and a GOP layer. The sequence layer begins with a sequence header and ends with a sequence end. The sequence layer comprises more than one GOP. The GOP layer begins with a GOP header and comprises a plurality of pictures. The first picture is always an I-picture (intra coded picture), followed by a P-picture (predictive coded picture) and a B-picture (bidirectional predictive coded picture).

The I-picture is an intra-frame coded picture, and therefore a single picture can be decoded with only the I-picture. The P-picture is an inter-frame forward-direction predictive coded picture, and transmits its difference with respect to a previous picture, as shown in FIG. 6. A decoding apparatus (decoder) adds the difference to the previous picture and thereby decodes a picture. Thus, the P-picture requires a picture to be referred to first, and the picture decoding uses the I-picture described above as the picture to be referred to and the P-picture created by referring to the I-picture.

The B-picture is a bidirectional predictive coded picture, and transmits its difference with respect to two pictures: a temporally preceding and a temporally succeeding picture, as shown in FIG. 7. The decoding apparatus adds the difference to the preceding and succeeding pictures, and thereby decodes a picture. Thus, the B-picture makes it possible to reduce difference data as compared with the P-picture by referring to two pictures.

FIG. 8 shows an example of an MPEG picture stream formed by I-, P-, and B-pictures. When such an MPEG picture stream is decoded, a conventional method decodes an I-picture, then decodes P-pictures by using a decoding result of the I-picture as a reference picture, and thereafter decodes B-pictures.

FIG. 9 shows a conventional decoding procedure. First, decoding is started at a step ST1. At a step ST2, a first picture is read from a receiving buffer, for example. At a step ST3, operations of the steps ST2 and ST3 are repeated until an I-picture is read.

When an I-picture is read from the stream, the process proceeds to steps ST4 and ST5 to branch according to the type of a read picture. When the read picture is an I-picture, the I-picture is decoded at a step ST6, and then the process proceeds to a step ST7. When the read picture is a P-picture, the P-picture is subjected to forward-direction decoding processing at a step ST8, and then the process proceeds to the step ST7. When the read picture is a B-picture, the B-picture is subjected to bidirectional decoding processing at a step ST9, and then the process proceeds to the step ST7.

At the step ST7, picture data as a decoding result is output. At a step ST10, the next picture is read, and then the process returns to the step ST4 to subject the read picture to decoding processing as described above according to the picture type.

As described above, even when an instruction to start decoding an MPEG picture stream is provided, the conventional decoding apparatus cannot decode P-pictures and B-pictures until the apparatus decodes an I-picture, and therefore a method such as blanking is adopted for the intervening period. Hence, when the digital broadcast receiver selects a channel and thereby changes the MPEG picture stream, for example, picture display on a display unit is interrupted for a moment.

A P-picture and a B-picture may have a small intra coded block unit. An intra coded block enables decoding using only the block and thus does not require a reference picture.

SUMMARY OF THE INVENTION

It is accordingly an object of the present invention to provide an apparatus and the like for decoding an MPEG picture stream that make it possible to quickly obtain output picture data.

According to an aspect of the present invention, an apparatus for decoding an MPEG picture stream includes an input unit operable to input an MPEG picture stream formed by an intra picture and a predictive coded picture; a decoder operable to decode each of the pictures of the input MPEG picture stream to produce a decoding result; a controller operable to instruct the decoder to start decoding; a writing unit operable to store the decoding result in a picture memory; and a reading unit operable to obtain output picture data from the picture memory; wherein, when the predictive coded picture includes an intra slice or an intra macroblock, the decoder decodes the intra slice or the intra macroblock after being instructed to start decoding by the controller without waiting for the intra picture to be decoded. When a reference macroblock has previously been decoded to produce a reference decoding result stored in the picture memory, the decoder is further operable to decode a non-intra slice and a non-intra macroblock of the predictive coded picture by using the reference decoding result after being instructed to start decoding by the controller without waiting for the intra picture to be decoded.

In addition, according to another aspect of the present invention, a method for decoding an MPEG picture stream includes inputting an MPEG picture stream formed by an intra picture and a predictive coded picture; providing an instruction to start decoding the input MPEG picture stream; decoding each of the pictures of the input MPEG picture stream to produce a decoding result after the instruction to start decoding has been provided; storing the decoding result in a picture memory; and obtaining output picture data from the picture memory; wherein, when the predictive coded picture includes an intra slice or an intra macroblock, the decoding step includes decoding the picture data, the intra slice or the intra macroblock after the step of providing the instruction to start decoding without waiting for the intra picture to be decoded. When a reference macroblock has previously been decoded to produce a reference decoding result stored in the picture memory, the decoding step further includes decoding the picture data, a non-intra slice and a non-intra macroblock of the predictive coded picture by using the reference decoding result after the step of providing the instruction to start decoding without waiting for the intra picture to be decoded.

According to the present invention, when a digital broadcast receiver selects a channel and thereby changes an MPEG picture stream, and then an instruction to start decoding is provided, for example, an intra slice and an intra macroblock of a predictive coded picture are decoded without waiting for an intra picture to be decoded. Furthermore, when a macroblock to be referred to has previously been decoded, a non-intra slice and a non-intra macroblock of the predictive coded picture are decoded by using a decoding result of the macroblock to be referred to, which is stored in the picture memory. Thus, when changing the channel, for example, it is possible to quickly obtain output picture data, shorten interruption of the pictures, and check a picture of the next channel in a short time.

The apparatus for decoding an MPEG picture stream further includes a storage unit operable to store the position of a decoded macroblock, and determines whether the macroblock to be referred to has previously been decoded on the basis of the stored content of the storage unit. Therefore, it is possible to correctly determine validity of the macroblock to be referred to and thus prevent decoding using a wrong reference picture. The picture memory, for example, is used as a storage medium. Specifically, part of a storage area for a decoding result of each macroblock is used as a flag portion, and a value unobtainable in an actual decoding result is written in the flag portion of an undecoded macroblock. Thus, by using the picture memory to store the position of a decoded macroblock, it is not necessary to provide a dedicated storage medium or storage area.

Furthermore, when the digital broadcast receiver selects a channel and thereby changes the MPEG picture stream, decoding results of decoded slices and macroblocks are sequentially written over existing results without initializing the picture memory. Thus, a picture from a channel before a channel change is smoothly switched to a picture from a channel after the channel change without interruption of the pictures, and therefore picture muting and the like are not required.

A method for decoding an MPEG picture stream is provided in accordance with a preferred embodiment of the present invention. The method comprises inputting an MPEG picture stream formed by an intra picture and a predictive coded picture; providing an instruction to start decoding said MPEG picture stream; decoding each of said pictures of said input MPEG picture stream to produce a decoding result after said instruction to start decoding has been provided; temporarily storing said decoding result; storing said decoding result in a picture memory after the temporary storage; and obtaining output picture data from said picture memory; wherein, when said predictive coded picture includes an intra slice or an intra macroblock, said decoding step includes decoding said intra slice or said intra macroblock after said step of providing said instruction to start decoding without waiting for said intra picture to be decoded.

A method for decoding an MPEG picture stream is provided in accordance with another preferred embodiment of the present invention. The method comprises inputting an MPEG picture stream formed by an intra picture and a predictive coded picture; descrambling scrambled data from said input MPEG picture stream with a descrambler; providing an instruction to start decoding said input MPEG picture stream; decoding each of said pictures of said input MPEG picture stream to produce a decoding result after said instruction to start decoding has been provided; storing said decoding result in a picture memory; and obtaining output picture data from said picture memory; wherein, when said predictive coded picture includes an intra slice or an intra macroblock, said decoding step includes decoding said intra slice or said intra macroblock after said step of providing said instruction to start decoding without waiting for said intra picture to be decoded.

In an alternative, the method further comprises downloading scramble key information from a removable medium; and setting the scramble key information in the descrambler.

BRIEF DESCRIPTION OF THE DRAWINGS

FIG. 8 illustrates an arrangement of MPEG I-, P-, and B-pictures and a conventional decoding method; and FIG. 9 is a flowchart illustrating a conventional decoding procedure.

DETAILED DESCRIPTION

An embodiment of the present invention will now be described with reference to the drawings.

Figure 1:
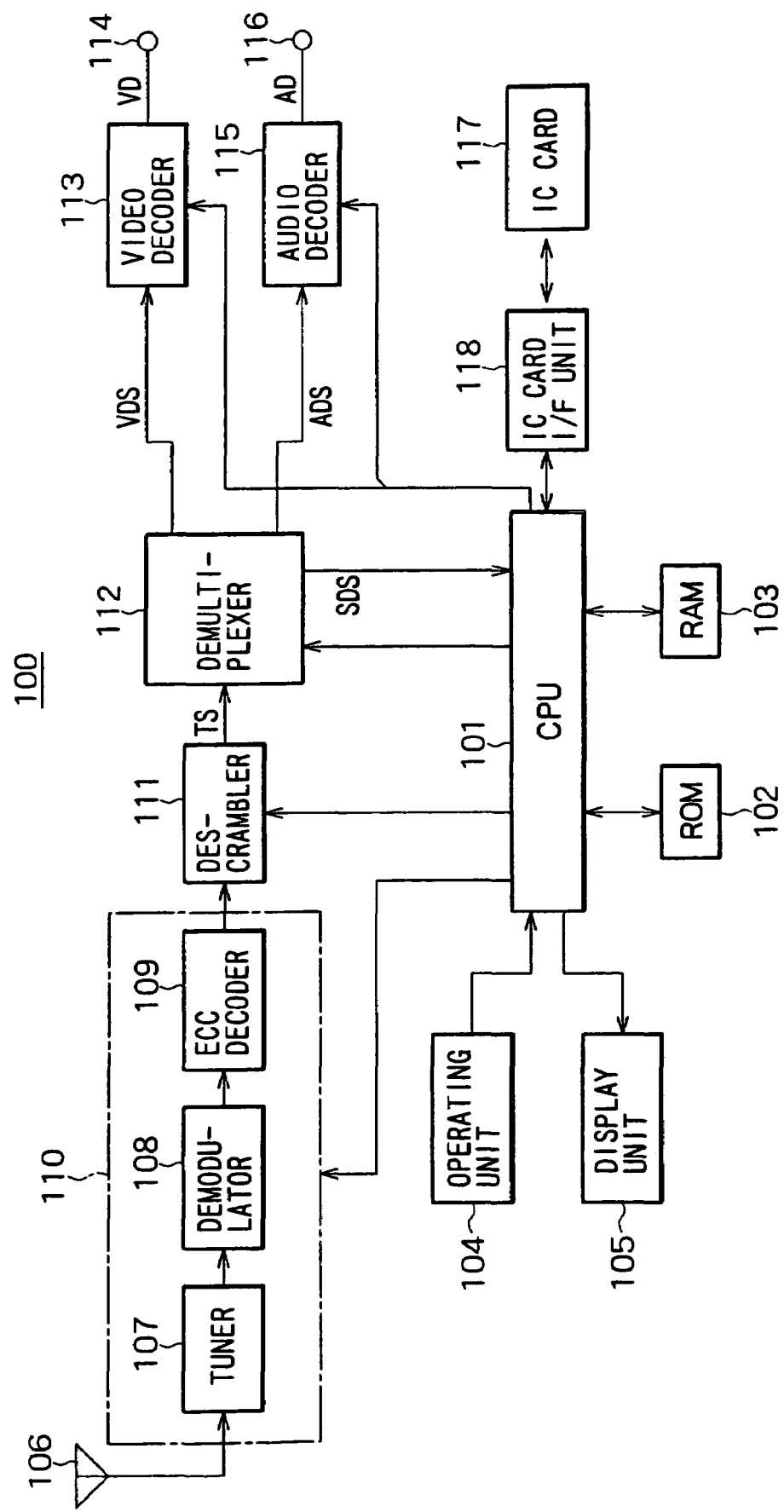
FIG. 1 is a block diagram showing the configuration of a digital broadcast receiver according to an embodiment of the present invention.

FIG. 1 shows the configuration of a digital broadcast receiver 100 according to an embodiment of the present invention.

The receiver 100 has a CPU (Central Processing Unit) 101 serving as a controller for controlling its overall operation. The CPU 101 is connected with a ROM (Read Only Memory) 102 that stores data and programs necessary for operation of the CPU 101; a RAM (Random Access Memory) 103 that stores data generated in association with control of the CPU 101 as well as supplementary data and the like obtained from an MPEG2 transport stream TS, as described later, and is used as a working area; an operating unit 104 having a plurality of operating keys and the like; and a display unit 105 formed by a liquid crystal display device or the like for displaying the status of the receiver 100 and the like.

The receiver 100 has an antenna 106 for receiving digital broadcast signals; and a tuner 107 for selecting the broadcast signal of a specified RF channel from the digital broadcast signals of a plurality of RF channels received by the antenna 106 and then outputting digital modulated data corresponding to the broadcast signal of the specified RF channel. The channel selecting operation of the tuner 107 is controlled by the CPU 101 according to the operation of the operating unit 104 by the user.

Also, the receiver 100 has a demodulator 108 for subjecting the digital modulated data output from the tuner 107 to demodulation processing; and an ECC (Error Correction Code) decoder 109 for subjecting the output data of the demodulator 108 to error correction processing and then providing an MPEG2 (Motion Picture Experts Group 2) transport stream TS corresponding to the broadcast signal of the specified RF channel described above. The transport stream TS is formed by a sequence of MPEG2 TS packets. The tuner 107, the demodulator 108, and the ECC decoder 109 form a front end 110.

In addition, the receiver 100 has a descrambler 111 for descrambling packets of scrambled video data and audio data forming the transport stream TS output from the ECC decoder 109; and a demultiplexer 112 for separating packets of video data and audio data of a program number (channel) specified by the operation of the operating unit 104 by the user from the transport stream TS output from the descrambler 111 to output a video data stream VDS and an audio data stream ADS formed by the packets, and for separating a packet of supplementary data of the program number (channel) to output a supplementary data stream SDS formed by the packet. The supplementary data stream SDS is supplied to the CPU 101.

Furthermore, the receiver 100 has a video decoder 113 for subjecting the video data stream VDS output from the demultiplexer 112 to data expansion processing to thereby provide output video data VD; an output terminal 114 for outputting the video data VD; an audio decoder 115 for subjecting the audio data stream ADS output from the demultiplexer 112 to data expansion processing to thereby provide output audio data AD; and an output terminal 116 for outputting the audio data AD.

The receiver 100 also has an IC card interface unit 118 to which an IC card 117 is connected. The IC card interface unit 118 is connected to the CPU 101. The IC card 117 stores scramble key information and also has a function of determining whether viewing is possible or not on the basis of limited reception information sent from the CPU 101 via the IC card interface unit 118 and sending the scramble key information to the CPU 101 via the IC card interface unit 118 when viewing is possible.

Operation of the digital broadcast receiver 100 shown in FIG. 1 will be described.

The digital broadcast signals of a plurality of RF channels received by the antenna 106 are supplied to the tuner 107. The tuner 107 selects a broadcast signal of a specified RF channel and then outputs digital modulated data corresponding to the broadcast signal. Then, the demodulator 108 subjects the digital modulated data to demodulation processing, and the ECC decoder 109 subjects output data of the demodulator 108 to error correction processing, whereby an MPEG2 transport stream TS is obtained.

The transport stream TS is supplied to the demultiplexer 112 via the descrambler 111. The demultiplexer 112 separates packets of video data and audio data of a program number (channel) specified by the user to provide a video data stream VDS and an audio data stream ADS formed by the packets.

The demultiplexer 112 also separates a packet of supplementary data of the program number (channel) from the transport stream TS to provide a supplementary data stream SDS formed by the packet. The supplementary data stream SDS is supplied to the CPU 101, and limited reception information extracted from the supplementary data stream SDS is supplied to the IC card 117 via the IC card interface unit 118.

The IC card 117 determines whether viewing is possible or not on the basis of the limited reception information. When viewing is possible, the IC card 117 sends scramble key information to the CPU 101 via the IC card interface unit 118. The CPU 101 sets the key information in the descrambler 111. Thus, the descrambler 111 descrambles packets of scrambled video data and audio data, and hence the demultiplexer 112 provides a video data stream VDS and an audio data stream ADS of descrambled data.

The video decoder 113 subjects the video data stream VDS output from the demultiplexer 112 to data expansion processing to thereby generate output video data VD, and the video data VD is output to the output terminal 114. The audio decoder 115 subjects the audio data stream ADS output from the demultiplexer 112 to data expansion processing to thereby generate output audio data AD, and the audio data AD is output to the output terminal 116.

Figure 2:
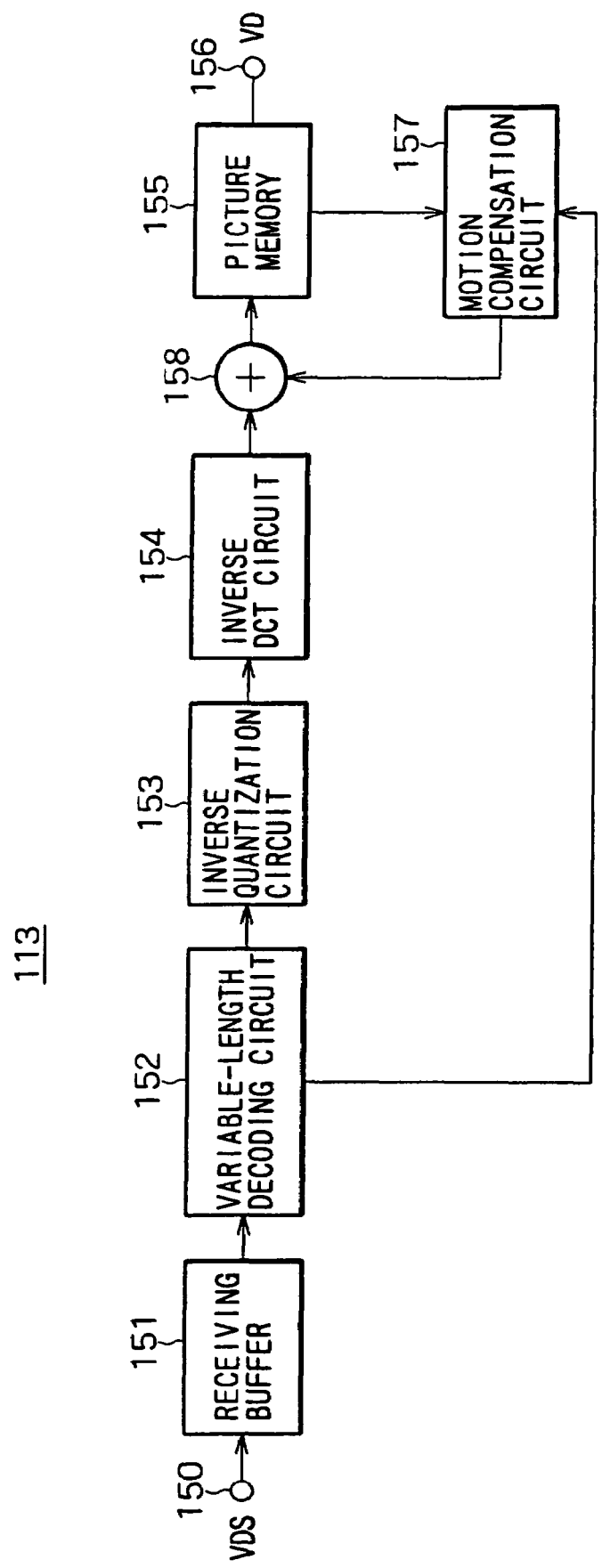
FIG. 2 is a block diagram showing the configuration of a video decoder in the digital broadcast receiver.

Details of the video decoder 113 will next be described. FIG. 2 shows the configuration of the video decoder 113.

The video decoder 113 has an input terminal 150 for inputting the video data stream VDS as an MPEG picture stream; a receiving buffer 151 for temporarily storing the video data stream VDS input to the input terminal 150; and a variable-length decoding circuit 152 for subjecting the video data stream VDS read from the receiving buffer 151 to variable-length decoding processing and then providing quantized DCT (discrete cosine transform) coefficient data and information of a motion vector and prediction mode. Incidentally, the receiving buffer 151 is provided to supply a fixed amount of data continuously to the decoding circuit 152.

The video decoder 113 also has an inverse quantization circuit 153 for subjecting the quantized DCT coefficient data obtained by the decoding circuit 152 to inverse quantization processing to thereby provide DCT coefficient data; an inverse DCT circuit 154 for subjecting the DCT coefficient data obtained by the inverse quantization circuit 153 to inverse DCT processing to thereby provide arithmetic data; a picture memory 155 for storing a result of decoding of each picture; and an output terminal 156 for outputting video data VD read from the picture memory 155.

The video decoder 113 also has a motion compensation circuit 157 for subjecting video data stored in the picture memory 155 to motion compensation based on the motion vector information obtained by the foregoing variable-length decoding circuit 152, and then generating reference video data corresponding to the prediction mode; and an adder 158 for adding the reference video data generated by the motion compensation circuit 157 to arithmetic data of non-intra macroblocks of a P-picture and a B-picture obtained by the inverse DCT circuit 154 to thereby provide video data as a decoding result.

Operation of the video decoder 113 shown in FIG. 2 will be described. The video data stream VDS input to the input terminal 150 is temporarily stored in the receiving buffer 151. Then, the video data stream VDS read from the receiving buffer 151 is supplied to the variable-length decoding circuit 152 to be subjected to variable-length decoding processing, whereby quantized DCT coefficient data and information of a motion vector and prediction mode are obtained. The thus obtained information of a motion vector and prediction mode is supplied to the motion compensation circuit 157.

The quantized DCT coefficient data obtained by the decoding circuit 152 is supplied to the inverse quantization circuit 153. The inverse quantization circuit 153 subjects the quantized DCT coefficient data to inverse quantization to thereby provide DCT coefficient data. The DCT coefficient data obtained by the inverse quantization circuit 153 is then supplied to the inverse DCT circuit 154. The inverse DCT circuit 154 subjects the DCT coefficient data to inverse DCT processing to thereby provide arithmetic data.

Consideration will now be given to a case where the inverse DCT circuit 154 outputs arithmetic data of a macroblock of an I-picture. In this case, the arithmetic data output by the inverse DCT circuit 154 is video data as a decoding result as it is. Thus, the arithmetic data is input to the picture memory 155 via the adder 158, and then written into an area corresponding to the macroblock.

Consideration will next be given to a case where the inverse DCT circuit 154 outputs arithmetic data of a macroblock of a P-picture. When the macroblock is an intra macroblock, the arithmetic data output by the inverse DCT circuit 154 is video data as a decoding result as it is. Thus, the arithmetic data is input to the picture memory 155 via the adder 158, and then written into an area corresponding to the macroblock. On the other hand, when the macroblock is a non-intra macroblock, reference video data corresponding to the forward-direction prediction mode generated by the motion compensation circuit 157 is added to the arithmetic data output by the inverse DCT circuit 154, whereby video data as a decoding result is obtained. The video data is input to the picture memory 155, and then written into an area corresponding to the macroblock.

Consideration will next be given to a case where the inverse DCT circuit 154 outputs arithmetic data of a macroblock of a B-picture. When the macroblock is an intra macroblock, the arithmetic data output by the inverse DCT circuit 154 is video data as a decoding result as it is. Thus, the arithmetic data is input to the picture memory 155 via the adder 158, and then written into an area corresponding to the macroblock. On the other hand, when the macroblock is a non-intra macroblock, reference video data corresponding to the bidirectional prediction mode generated by the motion compensation circuit 157 is added to the arithmetic data output by the inverse DCT circuit 154, whereby video data as a decoding result is obtained. The video data is input to the picture memory 155, and then written into an area corresponding to the macroblock.

Then, output video data VD is read from the picture memory 155 in which the decoding result is written as described above, and the video data VD is output to the output terminal 156.

Figure 3:
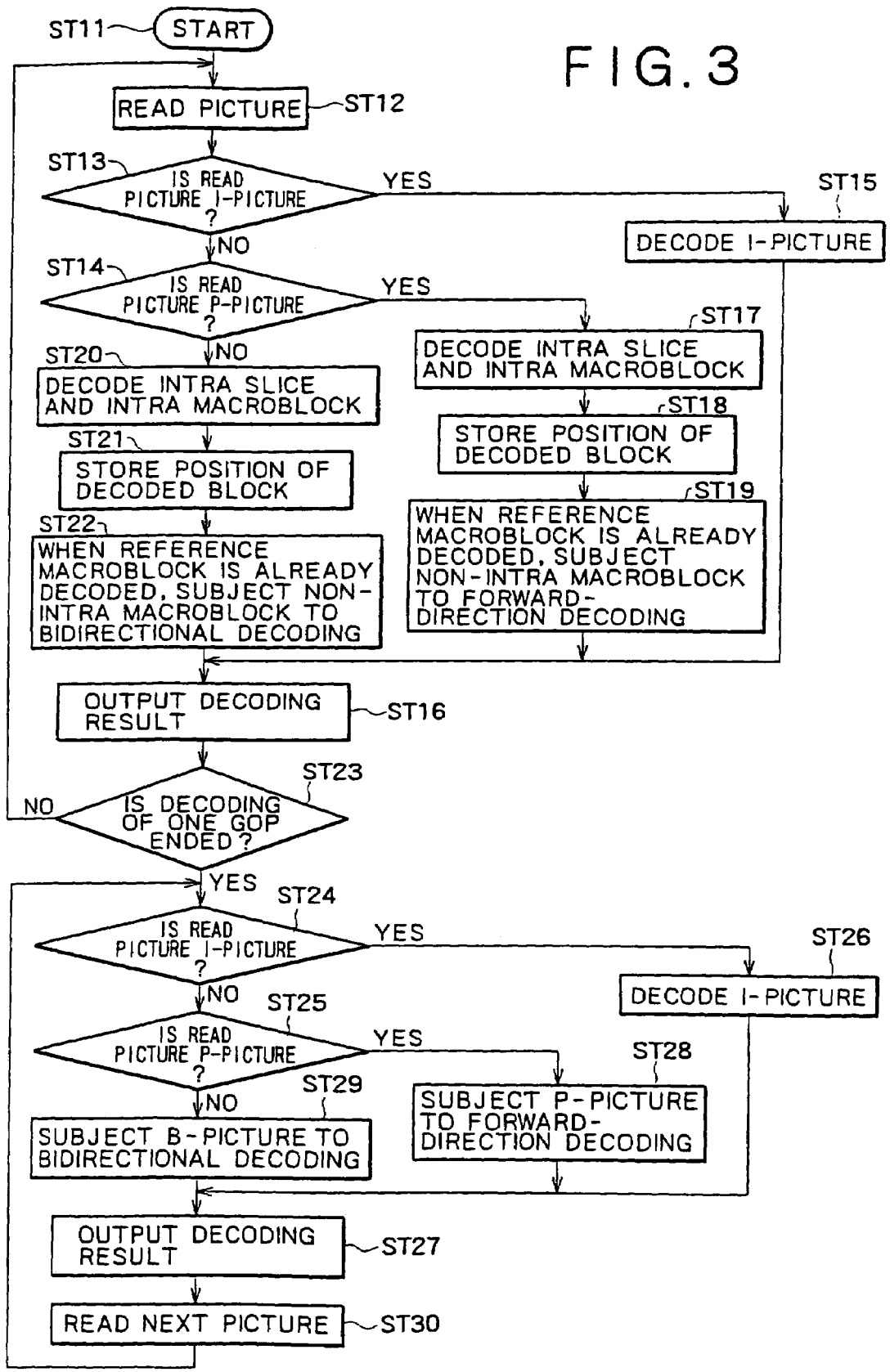
FIG. 3 is a flowchart illustrating the decoding procedure of the video decoder.

FIG. 3 illustrates the decoding procedure of the video decoder 113. For example, when the digital broadcast receiver 100 selects a channel and hence changes the video data stream VDS as an MPEG picture stream, and then the CPU 101 provides an instruction to start decoding, decoding is started at a step ST11, and at a step ST12, a first picture is read from the receiving buffer 151 and supplied to the variable-length decoding circuit 152.

At a step ST13, whether the read picture is an I-picture or not is determined. At a step ST14, whether the read picture is a P-picture or not is determined. When the read picture is an I-picture, the I-picture is decoded at a step ST15, and then the processing proceeds to a step ST16.

When the read picture is a P-picture, an intra slice and an intra macroblock within the P-picture are decoded at a step ST17, and the position of a decoded macroblock is stored at a step ST18.

In the present embodiment, the picture memory 155 is used as a storage medium for storing the position of the decoded macroblock. Specifically, part of the storage area for a decoding result of each macroblock in the picture memory 155 is used as a flag portion, and a value unobtainable in an actual decoding result is written in the flag portion of an undecoded macroblock. In this case, the position of a decoded macroblock is stored only by writing its decoding result into the picture memory 155.

At the next step ST19, when it is determined on the basis of the stored position of a decoded macroblock that a macroblock to be referred to is already decoded, a non-intra macroblock is subjected to forward-direction decoding processing using the decoding result of the decoded macroblock, and thereafter the processing proceeds to a step ST16.

When the read picture is a B-picture, an intra slice and an intra macroblock within the B-picture are decoded at a step ST20, and at a step ST21, as in the step ST18 described above, the position of a decoded macroblock is stored. At a step ST22, when it is determined on the basis of the stored position of a decoded macroblock that a macroblock to be referred to is already decoded, a non-intra macroblock is subjected to bidirectional decoding processing using the decoding result of the decoded macroblock, and thereafter the processing proceeds to the step ST16.

At the step ST16, video data VD as a decoding result is read from the picture memory 155 and then output. At a step ST23, whether the decoding of one GOP has ended or not is determined. When the decoding of one GOP has not ended, the processing returns to the step ST12 to repeat the same operations as described above. On the other hand, when the decoding of one GOP has ended, the processing proceeds to steps ST24 and ST25 to branch according to the type of a read picture. When the read picture is an I-picture, the I-picture is decoded at a step ST26, and then the processing proceeds to a step ST27. When the read picture is a P-picture, the P-picture is subjected to forward-direction decoding processing at a step ST28, and then the processing proceeds to the step ST27. When the read picture is a B-picture, the B-picture is subjected to bidirectional decoding processing at a step ST29, and then the processing proceeds to the step ST27.

At the step ST27, video data VD as a decoding result is read from the picture memory 155 and then output. At a step ST30, the next picture is read from the receiving buffer 151, and then the processing returns to the step ST24 to subject the read picture to decoding processing as described above according to the picture type.

The video decoder 113 shown in FIG. 2 performs decoding by the above-described decoding procedure illustrated in FIG. 3. Specifically, when an instruction to start decoding is provided, an intra slice and an intra macroblock of a predictive coded picture, such as a P-picture or a B-picture, are decoded without waiting for an I-picture to be decoded. Furthermore, when a macroblock to be referred to is already decoded, a non-intra slice and a non-intra macroblock of the predictive coded picture are decoded. Therefore, when changing the channel, for example, it is possible to quickly obtain video data VD as output picture data, shorten an interruption of the pictures, and check a picture of the next channel in a short time.

Figure 4:
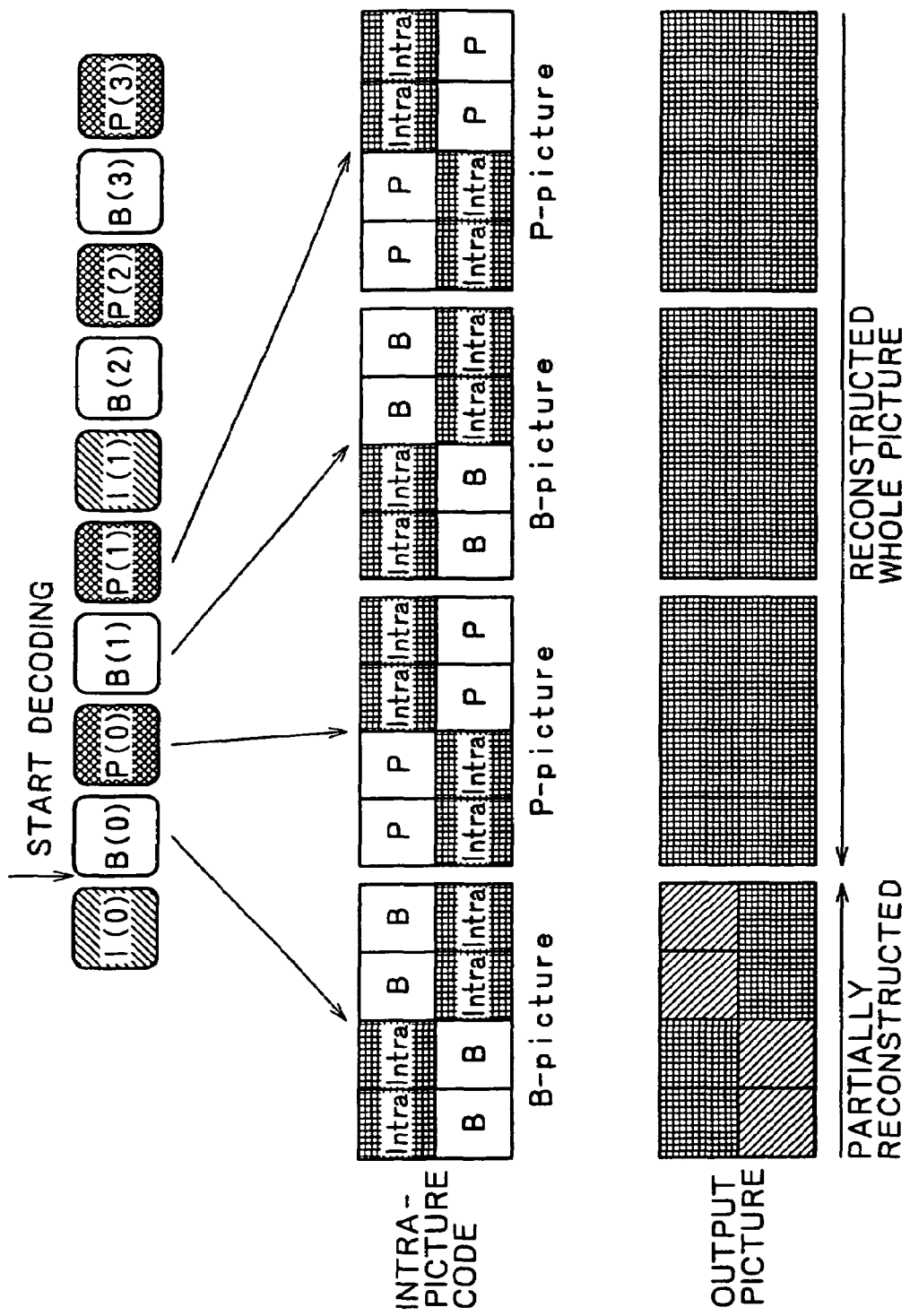
FIG. 4 illustrates a method of decoding P- and B-pictures including intra macroblocks.
Figure 5:
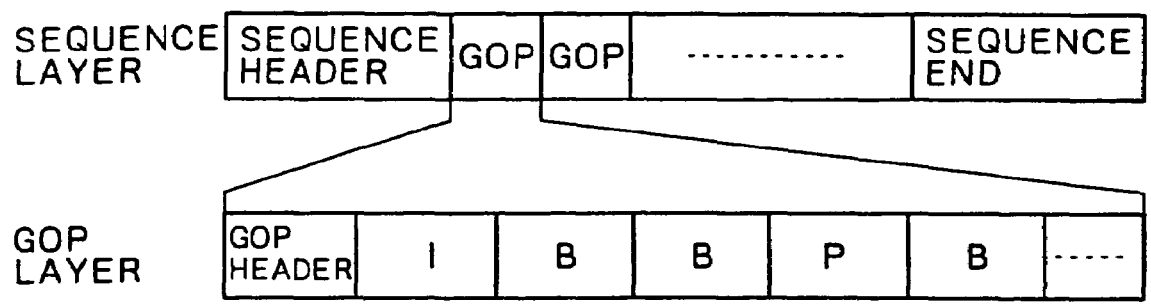
FIG. 5 shows a sequence layer and a GOP layer of MPEG coded data.
Figure 6:
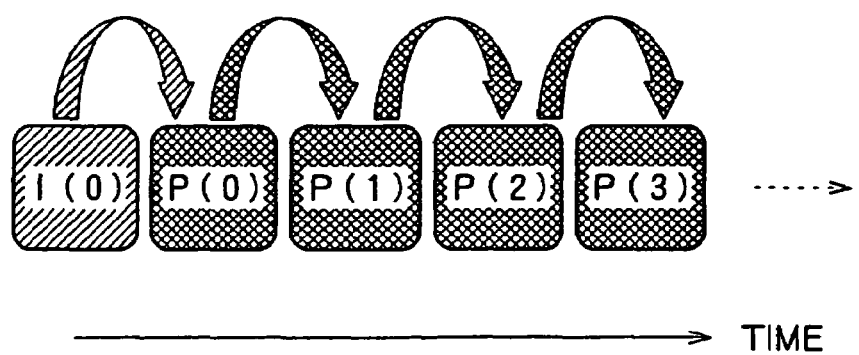
FIG. 6 shows an arrangement of MPEG I- and P-pictures.
Figure 7:
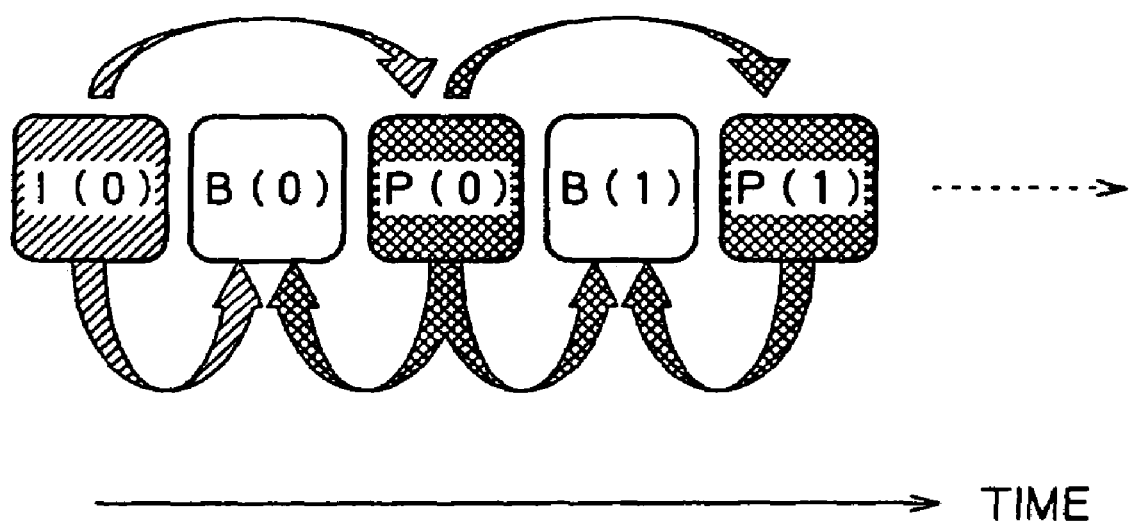
FIG. 7 shows an arrangement of MPEG I-, P-, and B-pictures.

FIG. 4 schematically shows the operation of the present embodiment when decoding is started at a midpoint of a GOP. FIG. 4 illustrates a case in which P-pictures and B-pictures are each formed by eight macroblocks, and the P-pictures and the B-pictures include intra macroblocks. In this case, the intra macroblocks of the P-pictures and the B-pictures are decoded without waiting for an I-picture of the next GOP to be decoded, and therefore a whole picture is reconstructed quickly.

As described above, according to the present embodiment, when the digital broadcast receiver 100 selects a channel and hence changes the video data stream VDS, and then an instruction to start decoding is provided, for example, an intra slice and an intra macroblock of a P-picture or a B-picture as a predictive coded picture are decoded without waiting for an I-picture to be decoded. Furthermore, when a macroblock to be referred to is already decoded, a non-intra slice and a non-intra macroblock of the predictive coded picture are decoded by using a decoding result of the macroblock to be referred to, which is stored in the picture memory 155. Thus, when changing the channel, for example, it is possible to quickly obtain output picture data, shorten interruption of the pictures, and check a picture of the next channel in a short time.

Also, the present embodiment stores the position of a decoded macroblock and determines whether a macroblock to be referred to is already decoded or not on the basis of the stored content. Therefore, it is possible to correctly determine validity of the macroblock to be referred to and thus prevent decoding using a wrong reference picture.

In addition, the present embodiment uses the picture memory 155 as a storage medium for storing the position of a decoded macroblock. Therefore, it is not necessary to provide a dedicated storage medium or storage area and thus the storage medium can be formed inexpensively.

Though not described above, when the digital broadcast receiver 100 selects a channel and thereby changes the video data stream VDS, decoding results of decoded slices and macroblocks are sequentially written over existing results without initializing the picture memory 155. Thus, a picture of a channel before the channel change is smoothly switched to a picture of a channel after the channel change without interruption of the pictures, and therefore picture muting and the like are not required.

It is to be noted that while in the foregoing embodiment, the present invention is applied to a digital broadcast receiver, the present invention is of course similarly applicable to other apparatus required to decode an MPEG picture stream.

According to the present invention, when a predictive coded picture includes an intra slice or an intra macroblock, the intra slice or the intra macroblock of the predictive coded picture is decoded after an instruction to start decoding without waiting for an intra picture to be decoded. Therefore, it is possible to quickly obtain output picture data. For example, it is possible to check a picture of the next channel in a short time when changing the channel of the digital broadcast receiver.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for decoding an MPEG picture stream, comprising:
   inputting an MPEG picture stream formed by an intra picture and a predictive coded picture;
   providing an instruction to start decoding said MPEG picture stream;
   decoding each of said pictures of said input MPEG picture stream to produce a decoding result after said instruction to start decoding has been provided;
   temporarily storing said decoding result;
   storing said decoding result in a picture memory after the temporary storage; and
   obtaining output picture data from said picture memory;
   wherein, when said predictive coded picture includes an intra slice or an intra macroblock, said decoding step includes decoding said intra slice or said intra macroblock after said step of providing said instruction to start decoding without waiting for said intra picture to be decoded.

2. A method for decoding an MPEG picture stream, comprising:
   inputting an MPEG picture stream formed by an intra picture and a predictive coded picture;
   descrambling scrambled data from said input MPEG picture stream with a descrambler;
   providing an instruction to start decoding said input MPEG picture stream;
   decoding each of said pictures of said input MPEG picture stream to produce a decoding result after said instruction to start decoding has been provided;
   storing said decoding result in a picture memory; and
   obtaining output picture data from said picture memory;
   wherein, when said predictive coded picture includes an intra slice or an intra macroblock, said decoding step includes decoding said intra slice or said intra macroblock after said step of providing said instruction to start decoding without waiting for said intra picture to be decoded.

3. The method of claim 2, further comprising:
   downloading scramble key information from a removable medium; and
   setting the scramble key information in the descrambler.

* * * * *